United States Patent [19]

Szpitalak

[11] 3,915,288

[45] Oct. 28, 1975

[54] CONVEYOR APPARATUS FOR HIGH SPEED CAN PRINTING MACHINE

[75] Inventor: Wesley J. Szpitalak, Palos Park, Ill.

[73] Assignee: Continental Can Company, Inc., New York, N.Y.

[22] Filed: Sept. 24, 1973

[21] Appl. No.: 399,967

Related U.S. Application Data

[62] Division of Ser. No. 242,110, April 7, 1972, Pat. No. 3,786,747, which is a division of Ser. No. 501,372, Oct. 22, 1965, Pat. No. 3,683,799.

[52] U.S. Cl. .................. 198/131; 198/189; 101/40
[51] Int. Cl.² ......................................... B65G 17/32
[58] Field of Search.......... 198/131, 178, 189, 22 R, 198/22 B; 101/38 A, 40

[56] References Cited
UNITED STATES PATENTS

| 2,233,555 | 3/1941 | Reisinger | 198/131 |
|---|---|---|---|
| 2,244,592 | 6/1941 | Youngs | 101/40 |
| 2,322,766 | 6/1943 | Maywald, Jr. | 198/131 |
| 2,399,630 | 5/1946 | Friden | 101/40 |
| 2,503,803 | 4/1950 | Cremer et al. | 198/131 |
| 2,664,991 | 1/1954 | Dean | 198/131 |
| 2,924,169 | 2/1960 | Scott | 198/131 |
| 3,124,065 | 3/1964 | Bozek et al. | 101/40 |
| 3,166,176 | 1/1965 | Turner | 198/131 |
| 3,279,360 | 10/1966 | Smith et al. | 101/40 |

*Primary Examiner*—Evon C. Blunk
*Assistant Examiner*—Richard K. Thomson
*Attorney, Agent, or Firm*—Diller, Brown, Ramik & Wight

[57] ABSTRACT

This disclosure relates to a movable support for moving and positioning can bodies and like tubular members with respect to components of an automatic coating and printing machine. The movable support includes an endless conveyor having special members at regularly spaced intervals and a mandrel carried by each special member for rotation, each special member including hub means having link elements pivotally mounted thereon, and there being chain sections including a plurality of pivotally connected links extending between adjacent ones of the special members with the chain sections being pivotally connected to link elements which, in turn, are pivotally mounted on the hub. The movable support is reversibly flexible so as to be movable about sprockets in opposite directions.

10 Claims, 4 Drawing Figures

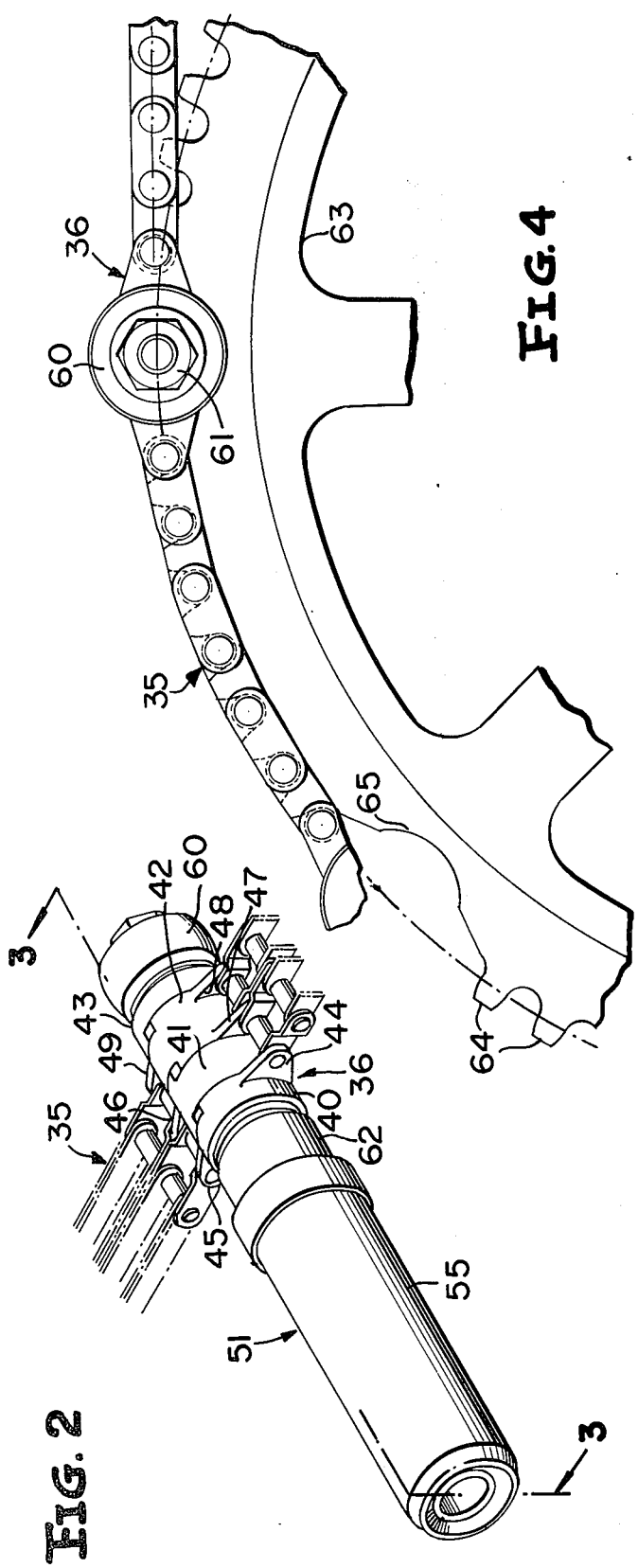

CONVEYOR APPARATUS FOR HIGH SPEED CAN PRINTING MACHINE

This application is a division of my copending application Ser. No. 242,110, filed on Apr. 7, 1972, entitled HIGH SPEED CAN PRINTING MACHINE, now U.S. Pat. No. 3,786,747, granted Jan. 22, 1974, which application Ser. No. 242,110 is a division of my application Ser. No. 501,372, filed Oct. 22, 1965, now U.S. Pat. No. 3,683,799, granted Aug. 15, 1972.

This invention relates in general to new and useful improvements in conveyor apparatus, and more specifically to a novel conveyor chain assembly for a printing machine which is particularly adapted for the high speed printing of can bodies.

Can bodies are principally formed from a flat blank which is shaped into cylindrical form and then secured together by means of a longitudinal seam. When it is desired to have the decoration directly applied to the exterior surface of such can bodies, the flat blanks can be printed in any conventional manner. However, recently there has been an increase in the demand for can bodies which are not formed from flat blanks and therefore cannot be printed or decorated in advance. There has been developed printing presses for printing on these can bodies after the formation thereof. However, these printing presses or machines which have been developed in the past are too slow. A customary type of printing machine is one having a plurality of mandrels carried by a turret with each mandrel being indexed sequentially into position relative to a printing drum and while the mandrel is in its indexed position, the can body carried thereby is presented to the printing drum. The cost of printing can bodies with this type of equipment is prohibitly expensive.

In view of the foregoing, it is the principal object of this invention to provide a novel high speed can printing machine which is capable of continuously printing can bodies and with the capacity of the machine being many times that of prior machines whereby the utilization of the machine is economically feasible.

In accordance with this invention it is proposed to provide a novel high speed can printing machine which includes an endless conveyor having mandrels projecting laterally therefrom, and there being provided means for automatically positioning can bodies on the mandrels and removing printed can bodies therefrom, the machine further providing novel means for presenting the moving can bodies carried by the mandrels to a printing drum whereby the necessary printing on the can bodies can be accomplished while the movement of the can bodies remains continuous.

An object of this invention is to provide a novel relationship between an endless chain having mandrels projecting therefrom and a printing drum, the chain passing around a sprocket having the same axis of rotation as the printing drum and the mandrels carried by the chain being disposed parallel to that axis and closely adjacent the printing drum whereby as the chain passes around the sprocket, can bodies carried by the mandrels are sequentially presented to the printing drum and the necessary printing is effected.

Another object of this invention is to provide a novel endless chain and mandrel assembly for use as part of a high speed printing machine for can bodies, the endless chain having special links formed therein at regularly spaced intervals and the mandrels being carried by the special links for rotation, each of the special links having a bearing unit or hub in which the mandrel is rotatably journalled, and there being carried by each hub a plurality of link elements which are mounted for limited pivotal movement whereby flexing of the chain with respect to the axis of the hub may be accomplished in opposite directions.

With the above and other objects in view that will hereinafter appear, the nature of the invention will be more clearly understood by reference to the following detailed description, the appended claims and the several views illustrated in the accompanying drawings:

IN THE DRAWINGS

FIG. 2 is an enlarged fragmentary perspective view showing a section of the endless conveyor chain and the general details of a mandrel carried thereby.

FIG. 3 is an enlarged fragmentary longitudinal sectional view taken along the line 3—3 of FIG. 2 and shows the specific details of the construction of the mandrel and the special link of the chain in which the mandrel is rotatably journalled.

FIG. 4 is a side elevational view of a portion of a sprocket having entrained thereover the chain of FIG. 2 and shows the relationship of the special link of the chain with respect to the sprocket.

Figure 1:
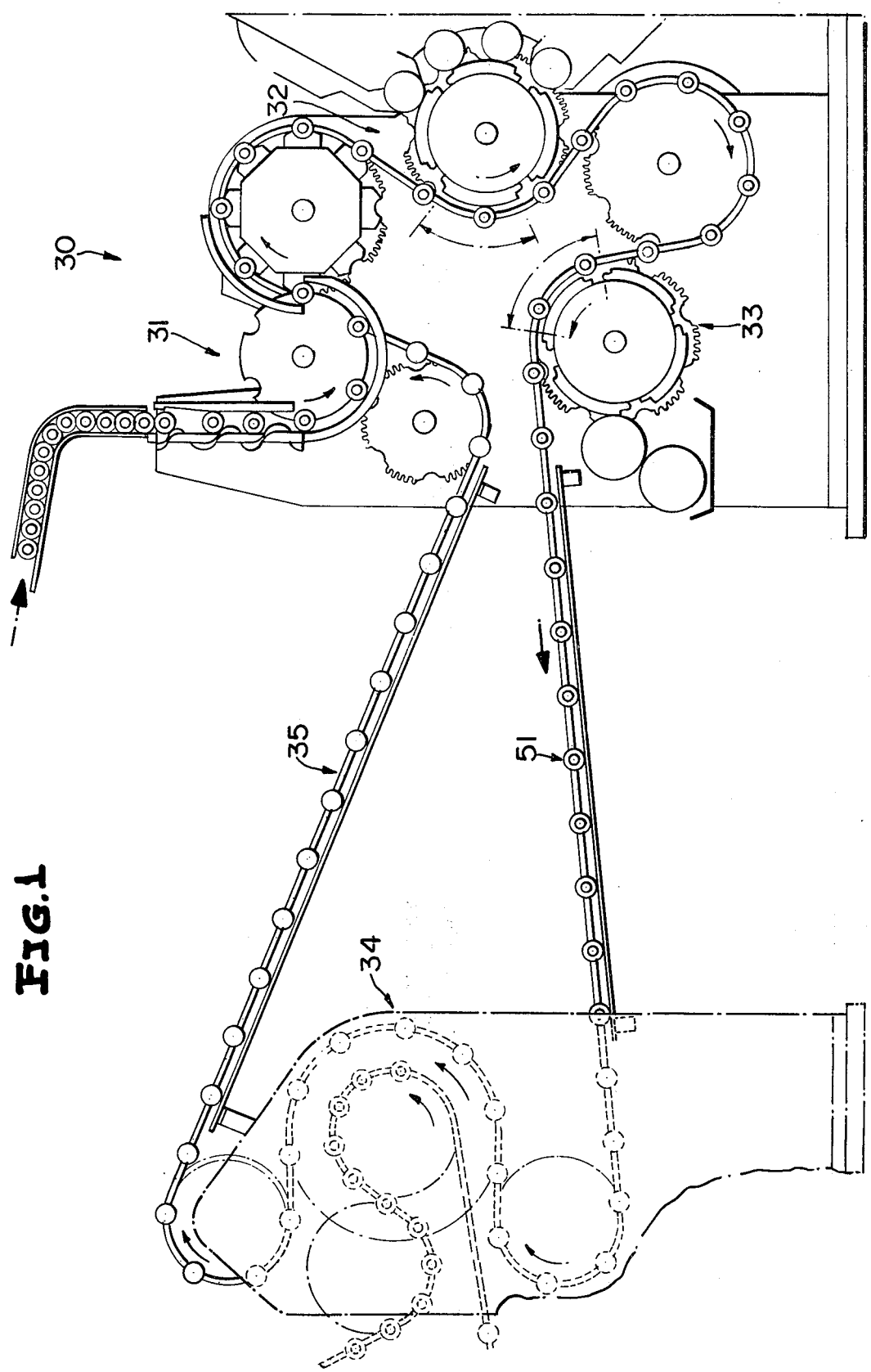
FIG. 1 is a diagrammatic side elevational view of the can printing machine and shows the relationship of the various components thereof.

Referring now to the drawings in detail, it will be seen that there are illustrated the details of the can printing machine, which is generally referred to by the numeral 30. The can printing machine 30 includes basically a can feed mechanism, which is generally referred to by the numeral 31, a printing mechanism or apparatus, which is generally referred to by the numeral 32, a varnishing apparatus, which is generally referred to by the numeral 33, and a can discharge or transfer apparatus, which is generally referred to by the numeral 34.

All of these mechanism or apparatus are connected together by an endless conveyor chain which is referred to by the numeral 35.

Referring now to FIGS. 2 and 4 in particular, it will be seen that the conveyor chain 35 is for the most part of the conventional type and is of the double row type. However, at regularly spaced intervals, the conveyor chain 35 is provided with special links which are referred to by the numeral 36. It is the constructional detail of the special links 36 which make the chain 35 a special chain.

Referring now to FIG. 4 in particular, it will be seen that the special link 36 includes a hub or bearing unit which is generally referred to by the numeral 37. The hub 37 includes a sleeve 38 which has secured in the opposite ends thereof bearing sleeves 39 of the flanged type. The sleeve 38 has journalled thereon four special link elements 40, 41, 42 and 43. The link elements 40 and 43 are identical while the link elements 41 and 42 are identical. However, it is to be noted that the link elements of each pair are reversely positioned on the sleeve 38. As is clear from FIG. 6, the link element 40 has a single ear 44 projecting to the right. The link element 41 has two ears 45 and 46 projecting to the left. The link element 42 has two ears 47 and 48 projecting to the right, and the link element 43 has a single ear 49 projecting to the left. The ears 44 and 45 are in alignment, the ears 46 and 47 are in alignment and the ears 48 and 49 are in alignment and are connected to the remaining links of the chain 35 in a conventional manner.

It will be readily apparent that the link elements 40 and 42 may pivot in unison in one clockwise direction while the link elements 41 and 43 are free to pivot in the opposite clockwise direction. Thus, the chain 35 may pivot about the axis of the special link 36 in opposite directions in the same manner as it does with respect to any other link thereof.

It is to be noted that the two link elements 41 and 42 have notches in the opposite faces thereof while the link elements 40 and 43 have notches in only the inner faces thereof. The notches of the link elements are not complementary, but each notch is in excess of 180° so as to allow limited relative pivoting between the link elements to accomplish the necessary flexibility of the conveyor chain 35.

Each of the special links 36 carries a mandrel which is generally referred to by the numeral 51. Each mandrel 51 includes a shaft 52 which is hollow for a purpose not part of this invention but which is utilized in the mounting and discharging of a can body from the mandrel 51. The hollow shaft 52 is rotatably journalled in the bearing sleeve 39. A hollow mandrel body 53 is secured to the left end of the shaft 52, as is viewed in FIG. 3, by means of a pin 54. The left end portion of the mandrel body 53 has a resilient cover 55 of a size to snugly fit within a can body. It is to be noted that the left end of the cover 55 is tapered as at 56 to facilitate the positioning of a can body on the mandrel 51. It is also to be noted that the right end of the cover 55 is secured to the mandrel body 53 by means of a set screw 57.

Each shaft 52 is provided with spacers 58 and 59 at the opposite ends of the hub 37. The right end of the shaft 52 carries a conventional cam follower 60 which is secured in place on the shaft 52 by means of a nut 61.

It is to be noted that the right end portion of the mandrel body 53 is enlarged and has positioned thereon a ring 62. The ring 62 may be of any suitable wear resistant material through which the mandrel 51 may be rotated by frictional engagement therewith.

Referring now to FIG. 4 in particular, it will be seen that there is illustrated a typical sprocket which for identification purposes is referred to by the numeral 63. The sprocket 63 is provided with teeth 64 arranged in two rows for normal engagement with the normal links of the chain 35. The sprocket 63 is recessed at regularly spaced intervals at 65. The recesses 65 correspond in spacing to the special links 36 and are of sufficient size to receive the hubs 37. It will be noted from FIG. 1 that although the chain 35 is provided with the enlarged links 36, due to the specific construction of the links 36, the chain 35 will flex in the opposite direction in the same manner as any other conventional type of chain.

Although only a preferred embodiment of the invention has been specifically illustrated and described herein, it is to be understood that minor variations may be made therein within the spirit and scope of the invention, as defined by the appended claims.

I claim:

1. A movable support comprising an endless conveyor having special members at regularly spaced intervals, and a mandrel carried by each special member, each special member including a hub having means supporting a respective mandrel for rotation about the axis thereof, plural link elements separately pivotally mounted on said hub, chain sections including a plurality of pivotally connected links extending between adjacent ones of said special members, and connecting means pivotally connecting ends of said chain sections to said link element on opposite sides of each hub wherein said movable support is reversely flexible.

2. The movable support of claim 1 wherein each hub includes a sleeve and bearing means at opposite ends of said sleeve, and each mandrel includes a shaft rotatably journalled in said bearing means.

3. The movable support of claim 2 wherein said shaft extends entirely through said hub and has a projecting end portion, and a cam follower carried by said shaft end portion.

4. The movable support of claim 1 wherein each mandrel has a drive ring thereon for effecting rotation of said mandrel.

5. The movable support of claim 1 wherein there are at least two chain sections between adjacent ones of said special members.

6. The movable support of claim 1 wherein there are at least three of said link elements with each link element having at least one ear thereon, and said connecting means including a pivot pin for each chain section, a pivot pin at one side of said hub being carried by an ear of two of said link elements, and a pivot pin at the opposite side of said hub being carried by a single one of said link elements.

7. The movable support of claim 6 wherein one link element is positioned between said two link elements.

8. The movable support of claim 6 wherein one link element is positioned between said two link elements and has two ears, and said one link element ears being aligned with said two link element ears.

9. The movable support of claim 8 wherein said ears are carried by portions of adjacent ones of said link elements disposed in axially projecting overlapping relation.

10. The movable support of claim 1 together with a supporting sprocket, said sprocket including spaced sets of radially projecting teeth engaging said chain sections, and radially inwardly disposed recesses positioned between adjacent sets of teeth for receiving said link elements.

* * * * *